US009637229B2

(12) United States Patent
van der Westhuizen

(10) Patent No.: US 9,637,229 B2
(45) Date of Patent: *May 2, 2017

(54) MISSION-ADAPTIVE ROTOR BLADE WITH CIRCULATION CONTROL

(71) Applicant: Groen Brothers Aviation Global, Inc., Salt Lake City, UT (US)

(72) Inventor: Jacob Johannes van der Westhuizen, South Jordan, UT (US)

(73) Assignee: Groen Aeronautics Corporation, Salt Lake City, UT (US)

(*) Notice: Subject to any disclaimer, the term of this patent is extended or adjusted under 35 U.S.C. 154(b) by 0 days.

This patent is subject to a terminal disclaimer.

(21) Appl. No.: 14/665,047

(22) Filed: Mar. 23, 2015

(65) Prior Publication Data

US 2016/0001881 A1 Jan. 7, 2016

Related U.S. Application Data

(62) Division of application No. 13/544,874, filed on Jul. 9, 2012, now Pat. No. 9,004,394.

(60) Provisional application No. 61/506,572, filed on Jul. 11, 2011.

(51) Int. Cl.
 *B64C 27/72* (2006.01)
 *B64C 27/26* (2006.01)
 *B64C 27/18* (2006.01)

(52) U.S. Cl.
 CPC .............. *B64C 27/72* (2013.01); *B64C 27/18* (2013.01); *B64C 27/26* (2013.01); *B64C 2027/7227* (2013.01); *Y02T 50/34* (2013.01)

(58) Field of Classification Search
 CPC . B64C 27/18; B64C 27/72; B64C 2027/7211; B64C 2027/7227; B64C 2230/06; B64C 2230/28
 See application file for complete search history.

(56) References Cited

U.S. PATENT DOCUMENTS

| 1,947,901 A | 2/1934 | De la Cierva |
| 2,352,342 A | 6/1944 | Pitcairn |
| 2,394,513 A * | 2/1946 | De Chappedelaine . B64C 27/18 244/208 |

(Continued)

OTHER PUBLICATIONS

Jessica Woods et al., Results of a Parametric Aeroelastic Stability Analysis of a Generic X-Wing Aircraft, NASA Technical Memorandum 101572, Apr. 1989.

(Continued)

*Primary Examiner* — Joseph W Sanderson
(74) *Attorney, Agent, or Firm* — The Watson I.P. Group, PLC; Jovan N. Jovanovic; Vladan M. Vasiljevic

(57) ABSTRACT

A rotorcraft may include an airframe and a rotor connected to the airframe. The rotor may include a plurality of blades defining ducts along the length thereof and vents in fluid communication with the ducts. Flow from through the vents may be controlled by valves with piezoelectric actuators. The valves may be adjusted to achieve a lift profile suited for an operational mode such as vertical, autorotative, or unloaded flight. The lift profile may vary along the length of the blade and may vary cyclically with rotation of the blade. The lift profile may be chosen to approximate a figure of merit for the rotor suitable for a given operational mode.

14 Claims, 8 Drawing Sheets

(56) References Cited

U.S. PATENT DOCUMENTS

| | | | | |
|---|---|---|---|---|
| 2,464,726 A * | 3/1949 | Stalker | ............... | B64C 27/46 244/17.23 |
| 2,476,002 A * | 7/1949 | Stalker | ............... | B64C 27/325 415/914 |
| 2,493,041 A * | 1/1950 | Stalker | ............... | B64C 27/325 244/17.25 |
| 2,617,487 A * | 11/1952 | Stalker | ............... | B64C 27/46 244/207 |
| 2,638,990 A * | 5/1953 | Pitcairn | ............... | B64C 27/325 244/207 |
| 3,005,496 A * | 10/1961 | Nichols | ............... | B64C 21/04 244/207 |
| 3,172,620 A * | 3/1965 | Darby | ............... | B64C 11/00 244/207 |
| 3,464,650 A * | 9/1969 | Girard | ............... | B64C 27/26 244/17.25 |
| 3,525,576 A | 8/1970 | Dorand | | |
| 3,588,273 A | 6/1971 | Kizilos | | |
| 3,713,750 A * | 1/1973 | Williams | ............... | B64C 27/325 244/207 |
| 4,711,415 A | 12/1987 | Binden | | |
| 5,301,900 A | 4/1994 | Groen et al. | | |
| 5,529,458 A | 6/1996 | Humpherson | | |
| 5,813,625 A * | 9/1998 | Hassan | ............... | B64C 23/06 244/17.11 |
| 6,109,565 A * | 8/2000 | King, Sr. | ............... | B64C 3/141 244/12.1 |
| 6,283,406 B1 * | 9/2001 | Remington | ............... | B64C 23/06 244/1 N |
| 6,530,542 B2 * | 3/2003 | Toulmay | ............... | B64C 27/001 244/17.13 |
| 6,629,674 B1 * | 10/2003 | Saddoughi | ............... | B64C 11/16 244/204 |
| 6,644,598 B2 * | 11/2003 | Glezer | ............... | B64C 21/04 244/200 |
| 7,837,141 B2 * | 11/2010 | Kennedy | ............... | B64C 27/18 239/508 |
| 9,004,394 B2 * | 4/2015 | van der Westhuizen | ............... | B64C 27/72 244/17.11 |
| 2002/0190165 A1 * | 12/2002 | Glezer | ............... | B64C 21/04 244/207 |
| 2012/0141271 A1 * | 6/2012 | Southwick | ............... | F03D 1/0633 416/23 |
| 2013/0094959 A1 * | 4/2013 | Scott | ............... | B64C 27/473 416/1 |

OTHER PUBLICATIONS

John Ballard et al., An Investigation of a Stoppable Helicopter Rotor with Circulation Control NASA, Aug. 1980.

Arthur W. Linden and James C. Biggers, X-Wing Potential for Navy Applications, estimated 1959.

Robert Sopher and James Duh, Prediction of Aeroelastic Response of a model X-Wing Rotor Sikorsky Aircraft Division, United Technologies, Feb. 19-21, 1986.

William Willshire, Rye Canyon X-Wing Noise Test: One-Third Octave Band Data, NASA Technical Memorandum, Jan. 1983.

M. Mosher, Acoustic Measurements of the X-Wing Rotor, NASA Technical Memorandum 94292, Ames Research Center, Moffett Field, CA, 1983.

G. Warren Hall et al., Flight Testing the Fixed-Wing Configuration of the Rotor Systems Research Aircraft, NASA, Jun. 1985.

Gerald J. Healy, X-Wing Noise Data Acquisition Program, NASA, Feb. 1983.

D. N. Goldstein et al., Rotorcraft convertible Engine Study, Final Report, NASA Lewis Research Center, Aug. 1983.

Michael G. Gilbert et al., The Effects of Aeroelastic Deformation on the Unaugmented Stopped-Rotor Dynamics of an X-Wing Aircraft, NASA, Jun. 1987.

* cited by examiner

MISSION-ADAPTIVE ROTOR BLADE WITH CIRCULATION CONTROL

RELATED APPLICATIONS

This application: is a divisional of U.S. patent application Ser. No. 13/544,874, filed Jul. 9, 2012; which claims the benefit of U.S. Provisional Patent Application Ser. No. 61/506,572, filed Jul. 11, 2011; both of which are hereby incorporated by reference.

Additionally, this patent application hereby incorporates by reference U.S. Pat. No. 5,301,900 issued Apr. 12, 1994 to Groen et al., U.S. Pat. No. 1,947,901 issued Feb. 20, 1934 to J. De la Cierva, and U.S. Pat. No. 2,352,342 issued Jun. 27, 1944 to H. F. Pitcairn.

BACKGROUND

1. The Field of the Invention

This invention relates to rotating wing aircraft (rotorcraft), and, more particularly to rotorcraft relying on autorotation of a rotor to provide lift.

2. The Background Art

Rotorcraft rely on a rotating wing to provide lift. In contrast, fixed-wing aircraft rely on air flow over a fixed wing to provide lift. Fixed-wing aircraft must therefore achieve a minimum ground velocity on takeoff before the lift on the wing is sufficient to overcome the weight of the plane. Fixed-wing aircraft therefore generally require a long runway along which to accelerate to achieve this minimum velocity and takeoff.

In contrast, rotorcraft can take off and land vertically or along short runways inasmuch as powered rotation of the rotating wing provides the needed lift. This makes rotorcraft particularly useful for landing in urban locations or undeveloped areas without a proper runway.

The most common rotorcraft in use today are helicopters. A helicopter typically includes an airframe, housing an engine and passenger compartment, and a rotor, driven by the engine, to provide lift. Forced rotation of the rotor causes a reactive torque on the airframe. Accordingly, conventional helicopters require either two counter rotating rotors or a tail rotor in order to counteract this reactive torque.

Another type of rotorcraft is the autogyro. An autogyro aircraft derives lift from an unpowered, freely rotating rotor comprising two or more rotor blades. The energy to rotate the rotor results from a windmill-like effect of air passing through the underside of the rotor (i.e., autorotation of the rotor). The Bernoulli effect of the airflow moving over the rotor blade surface creates lift. The forward movement of the aircraft comes in response to a thrusting engine such as a motor driven propeller mounted fore or aft.

During the early years of aviation, autogyro aircraft were proposed to avoid the problem of aircraft stalling in flight and to reduce the need for runways. In autogyro aircraft, the relative airspeed of the rotor blades may be controlled or influenced somewhat independent of the forward airspeed of the autogyro, allowing slow ground speed for takeoff and landing, and safety in slow-speed flight.

Various autogyro devices in the past have provided some means to begin rotation of the rotor prior to takeoff (i.e., prerotation). Prerotation may minimize the takeoff distance down a runway. One type of autogyro is the "gyrodyne." Examples of such aircraft are the XV-1 convertiplane tested in 1954 and the Rotodyne built by Fairey Aviation in 1962. The gyrodyne includes a thrust source providing thrust in a flight direction and a rotor providing autorotative lift at cruising speeds. Jet engines located on the tip of each rotor blade provided rotation of the rotor during takeoff, landing, and hovering.

Although typical rotorcraft provide the significant advantage of vertical takeoff and landing (VTOL), they are much more limited in their maximum flight speed than are fixed-wing aircraft. One reason that prior rotorcraft are unable to achieve high flight speed is a phenomenon known as "retreating blade stall."

In a fixed-wing aircraft, all wings move forward in fixed relation with respect to one another and the airframe. However, as a rotorcraft moves in a flight direction, rotation of the rotor causes each blade thereof to be either "advancing" or "retreating." A blade is advancing if it is moving in the same direction as the flight direction. A blade is retreating if it is moving opposite the flight direction. Thus, the velocity of any point on any blade is the velocity of that point, with respect to the airframe, plus the velocity of the airframe.

Rotor blades are airfoils that provide lift based on the speed of air flow thereover. Accordingly, the advancing blade typically experiences much greater lift than the retreating blade. If left uncheck, this disproportionate lift may render the rotorcraft unflyable. One solution to this problem is allowing the rotor blades to "flap." Flapping enables rotorcraft to travel in a direction substantially perpendicular to the axis of rotation of the rotor.

With flapping, an advancing blade is allowed to fly or flap upward in response to the increased air speed thereover, thereby reducing the blade's angle of attack. This, in turn, reduces the lift generated by the advancing blade. A retreating blade experiences less air speed and tends to fly or flap downward such that its angle of attack is increased. This, in turn, increases the lift generated by the retreating blade. In this manner, flapping balances the lift generated by the advancing and retreating blades.

However, lift equalization due to flapping is limited by retreating blade stall. As noted above, flapping of the rotor blades increases the angle of attack of the retreating blade. At certain higher speeds in the direction of flight, the increase in the blade angle of attack required to equalize lift results in loss of lift (stalling) of the retreating blade.

A second limit on the speed of rotorcraft is the drag at the tips of the rotor blades. The tip of the advancing blade is moving at a speed equal to the speed of the aircraft relative to the surrounding air, plus the speed of the tip of the blade with respect to the aircraft. Thus, the speed at the tip of an advancing blade is equal to the sum of the flight speed of the rotorcraft plus the product of the length of the blade and the angular velocity of the rotor.

In helicopters, the rotor must rotate to provide both upward lift and thrust in the direction of flight. Increasing the speed of a helicopter increases the air speed at the tip, both because of the increased flight speed as well as the increased angular velocity of the rotors required to provide supporting thrust. The speed at the tip of the advancing blade could therefore approach the speed of sound, even when the flight speed of the rotorcraft was actually much less. As the air speed over the tip approaches the speed of sound, the drag on the blade becomes greater than the engine can overcome. Accordingly, helicopters are quite limited in how fast they can fly.

In autogyro aircraft, the tips of the advancing blades are also subject to this increased drag, even for flight speeds much lower than the speed of sound. The tip speed for an autogyro is typically smaller than that of a helicopter, for a given airspeed, since the rotor is not driven. Nevertheless, the same drag increase occurs eventually.

A third limit on the speed of rotorcraft is reverse air flow over the retreating blade. As noted above, the retreating blade is traveling opposite the flight direction with respect to the airframe. At certain high speeds in the direction of flight, portions of the retreating blade may move rearward, with respect to the airframe, slower than the flight speed of the airframe. Accordingly, the direction of air flow over those portions of the retreating blade is reversed from that typically designed to generate positive lift.

Rather than generating positive lift, reverse air flow may impose negative lift, or a downward force, on the retreating blade. That is, an airfoil with positive angle of attack in a first direction has a negative angle of attack in a second direction, opposite the first direction.

The ratio of air speed of a rotorcraft in the direction of flight to the maximum corresponding air speed at the tips of the rotor blades is known as the "advance ratio." The maximum advance ratio of currently available rotorcraft is less than 0.5. For most helicopters, the maximum achievable advance ratio is between about 0.3 and 0.4. Accordingly, current rotorcraft are limited to a top flight speed of about 200 miles per hour (mph) or less.

Rotorcraft are typically equipped with rotor blades having a fixed geometry in terms of chord and twist. The rotor blade geometry of such rotorcraft cannot be changed once the blade has been manufactured and fitted to the rotorcraft. Several efforts have been made to address this limitation. Such efforts typically focus on adding flaps to a rotor blade. These flaps are controlled in the same way as flaps on fixed wing aircraft.

Another method that has been tried in experimental aircraft is circulation control based on the Coanda effect. In such embodiments, compressed air is released from a longitudinal slot positioned at either the leading edge, trailing edge, or both. The compressed air exiting the rotor blade acts like a leading or trailing edge slat or flap, effectively changing the functional geometry of the blade.

However, flaps add significant complexity to the rotor blade of a rotorcraft. Similarly, circulation control requires delivery of relatively high temperature air through the interior of a rotor blade. Prior attempts at this method have been unsuccessful due to an inability to control the airflow to achieve the proper lift profile over the flight envelope of the aircraft.

In view of the foregoing, it would be an advancement in the art to provide a rotor blade exhibiting different lift profiles configured to match or better fit the particular task as hand (e.g., VTOL, horizontal flight, high speed flight, etc.).

BRIEF SUMMARY OF THE INVENTION

The invention has been developed in response to the present state of the art and, in particular, in response to the problems and needs in the art that have not yet been fully solved by currently available apparatus and methods. The features and advantages of the invention will become more fully apparent from the following description and appended claims, or may be learned by practice of the invention as set forth hereinafter.

In one aspect of the invention, a rotorcraft includes an airframe and a rotor mounted to the airframe. The rotor includes a plurality of blades each defining a blade duct and a plurality of vents along a longitudinal extent thereof. A plurality of valves positioned to control airflow from the blade duct pass air through the plurality of vents.

A compressed air source is in fluid communication with the blade ducts. A control unit is operably coupled to the plurality of valves and is programmed to adjust the valves in a manner effective to achieve a first lift profile along each blade in a first operational mode. The control unit will adjust the valves effective to achieve a second lift profile along each blade in a second operational mode.

In some embodiments, the first operational mode includes at least one of taking off, hovering, and landing, and the second operational mode is autorotative flight. The control system may be further programmed to adjust the valves to be effective to achieve a third lift profile along each blade in a third operational mode, typically where the third operational mode is unloaded flight.

In another aspect of the invention, the valves are coupled to piezoelectric actuators operably coupled to the control unit.

In another aspect of the invention, the control system is programmed to cyclically vary the first and second lift profiles with a period equal to an integer multiple of a period of rotation of the rotor.

In another aspect of the invention, the first lift profile approximates a first figure of merit greater than that of an original geometry of the blade. The first figure of merit is suitable for the first operational mode. The second lift profile may approximate a second figure of merit, still greater than that of an original geometry of the blade and greater than that of the first lift profile. The second figure of merit is suitable for the second operational mode.

A corresponding method of operation is also disclosed and claimed herein.

BRIEF DESCRIPTION OF THE DRAWINGS

The foregoing features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

DETAILED DESCRIPTION OF SELECTED EMBODIMENTS

Figure 1:
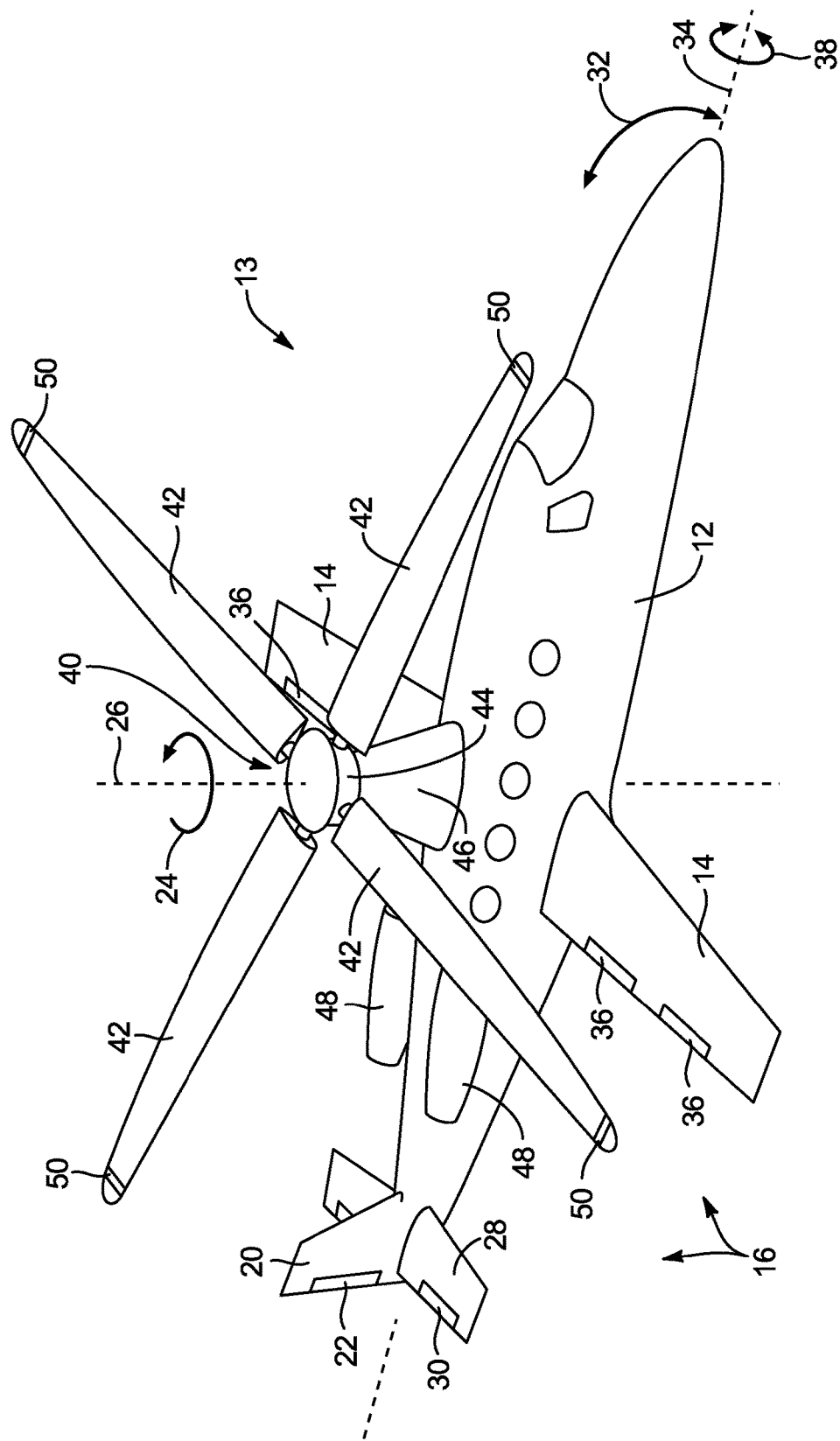
FIG. 1 is a perspective view of a rotorcraft in accordance with one embodiment of the present invention, the rotorcraft having two engines and one rotor.

It will be readily understood that the components of the present invention, as generally described and illustrated in the drawings herein, could be arranged and designed in a wide variety of different configurations. Thus, the following more detailed description of the embodiments of the system and method of the present invention, as represented in the drawings, is not intended to limit the scope of the invention, as claimed, but is merely representative of various embodiments of the invention. The illustrated embodiments of the invention will be best understood by reference to the drawings, wherein like parts are designated by like numerals throughout.

Referring to FIG. 1, a rotorcraft 10 in accordance with the present invention may include an airframe 12 defining a cabin for carrying an operator, passengers, cargo, or the like. The airframe 12 may include one or more fixed wings 14 or airfoils 14 providing lift to the rotorcraft 10. The wings 14 may be configured such that they provide sufficient lift to overcome the weight of the rotorcraft 10 (or any significant portion thereof) only at comparatively high speeds.

That is, a rotorcraft 10 may be capable of vertical takeoff and landing (VTOL) and may not need lift from the fixed wings 14 at low speeds (e.g., below 50 mph or even 100 mph). Accordingly, the wings 14 may be made smaller than those of fixed-wing aircraft requiring a high velocity takeoff. The smaller wings 14 may result in lower drag at higher velocities. In some embodiments, the wings 14 may provide sufficient lift to support at least 50 percent, preferably about 90 percent, of the weight of the rotorcraft 10 at air speeds above 200 mph.

Control surfaces 16 may form part of an airframe 12. For example a tail structure 18 may include one or more vertical stabilizers 20 and one or more rudders 22. The rudders 22 may be adjustable to control yaw 24 of the rotorcraft 10 during flight. As known in the art, yaw 24 is defined as rotation about a vertical axis 26 of the rotorcraft 10. In the illustrated embodiment, the rudders 22 may comprise hinged portions of the vertical stabilizers 20.

The tail structure 18 may further include a horizontal stabilizer 28 and an elevator 30. The elevator 30 may be adjustable to alter pitch 32 of the rotorcraft 10. As known in the art, pitch 32 is defined as rotation about an axis extending laterally with respect to the airframe 10. In the illustrated embodiment, the elevator 30 is a hinged portion of the horizontal stabilizer 28. In some embodiments, twin rudders 22 may be positioned at an angle relative to the vertical axis 26 and serve both to adjust or control yaw 24 and pitch 32 of the rotorcraft 10.

The control surfaces 16 may also include ailerons 36 on the wings 14. Ailerons 36 may be used to control roll 38 of the rotorcraft 10. As known in the art, roll 38 is defined as rotation about the longitudinal axis 34 of the rotorcraft 10.

Lift during vertical takeoff and landing, and for augmenting lift of the wings 14 during flight, may be provided by a rotor 40. A rotor 40 may comprise a number of individual rotor blades 42 extending radially away from a hub 44. The hub 44 may be coupled to a mast 46. The mast may extend to connect the hub 44 to the rest of the airframe 12.

Figure 2:
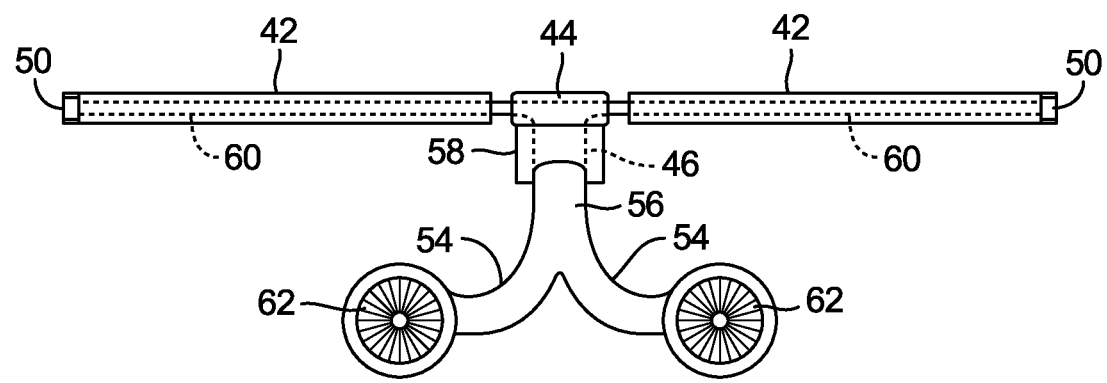
FIG. 2 is a schematic front elevation view of a compressed or otherwise pressurized air supply for tip jets in accordance with one embodiment of the present invention.

Referring to FIG. 2, a rotor 40 may be coupled to one or more engines 48 housed in a fuselage portion of the airframe 12 or in one or more adjacent nacelles. The engines 48 may provide thrust during flight of the rotorcraft 10. The engines 48 may also generate compressed air for the tip jets 50.

For example, in selected embodiments, the engines 48 may comprise one or more bypass turbines 62. All or a portion of the bypass air from the turbines 62 may be directed to the tip jets 50. Alternatively, the engines 48 may drive one or more auxiliary compressors, which in turn may provide the compressed air for the tip jets 50. In still other embodiments, all or a portion of the compressed air may be generated by one or more dedicated, single purpose engines, motors, or the like. Using the compressed air, the tip jets 50 may power the rotor 40 during takeoff, landing, hover, or whenever the flight speed of the rotorcraft 10 is too low for sufficient lift from autorotation of the rotor 40.

In selected embodiments, the compressed air generated by the engines 48 may be conducted to the tip jets 50 via one or more conduits or ducts 54, 55. For example, bypass air from one or more bypass turbines 62 may be transmitted through ducts 54 to a plenum 56. The plenum 56 may be in fluid communication via ducting 55 with a mast 46 that is hollow or has another passage to provide for air conduction. For example, a mast fairing 58 positioned around the mast 46 may provide one or both of an air channel and a low drag profile for the mast 46. The mast 46 or mast fairing 58 may be in fluid communication with a hub 44. Finally, the hub 44 may be in fluid communication with an interior conduit 60 within each of the various rotor blades 42. Accordingly, the compressed air may travel radially within the interior conduits 60 to feed the corresponding tip jets 50.

Figure 3A:
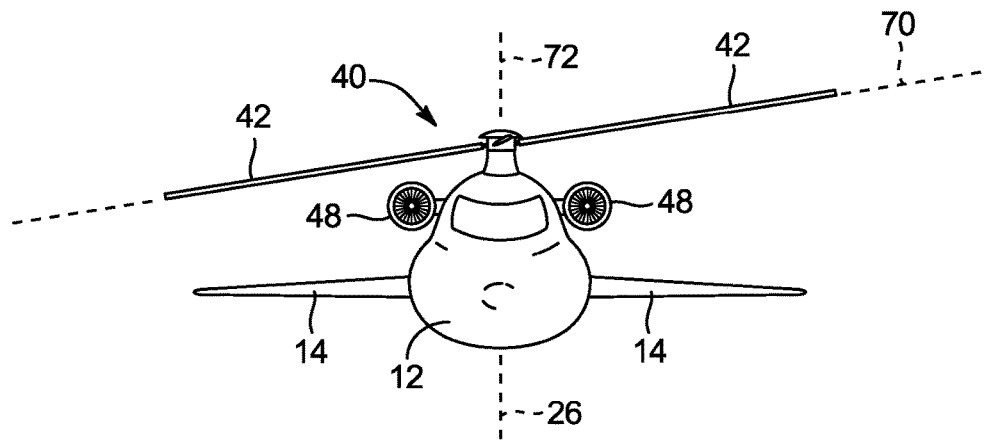
FIG. 3A is a front elevation view of a rotorcraft illustrating operational parameters describing a rotor configuration suitable for use in accordance with the present invention and the system of FIGS. 1 and 2 in particular.
Figure 3B:
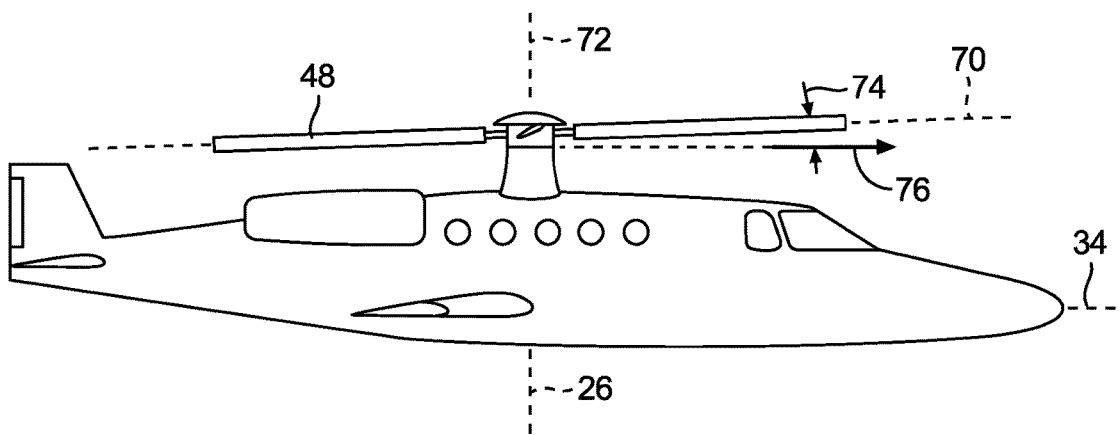
FIG. 3B is a right side elevation view of the rotorcraft of FIG. 3A.
Figure 3C:
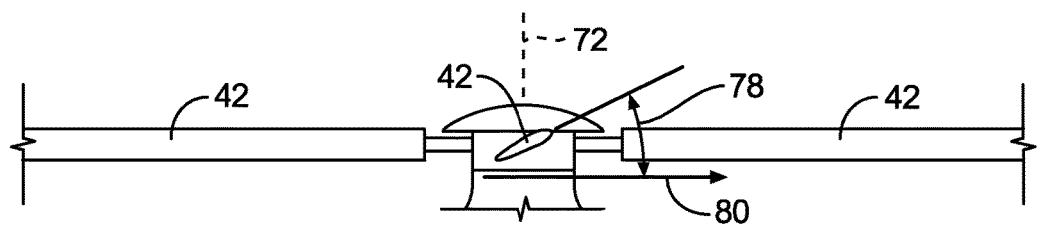
FIG. 3C is a partial cut of a right side elevation view of the rotor of FIG. 3A.

Referring to FIGS. 3A-3C, rotation of the rotor 40 about its axis of rotation occurs in a rotor disc 70 that is generally planar but may be contoured due to flexing of the blades 42. In general, the rotor disc 70 may be defined as a space in which the tips of the blades 42 travel. Inasmuch as the blades 42 flap cyclically upward and downward due to changes in lift while advancing and retreating, the rotor disc 70 may be angled or contoured with respect to the axis of rotation when viewed along the longitudinal axis 34, as shown in FIG. 3A.

Referring to FIG. 3B, the angle 74 of the rotor disc 70, relative to a flight direction 76 in the plane containing the longitudinal axis 34 and vertical axis 26, is defined as the rotor angle of attack 74 or rotor disk angle of attack 74. For purposes of this application, flight direction 76 and air speed refer to the direction and speed, respectively, of the airframe 12 of the rotorcraft 10 relative to surrounding air. In autogyro systems, the angle of attack 74 of the rotor disc 70 is generally positive in order to achieve autorotation of the rotor 40 and the resulting lift.

Referring to FIG. 3C, the surfaces of the rotor blades 42, and particularly the chord of each blade 42, define a pitch angle 78, or blade angle of attack 78, relative to the direction of movement 80 of the rotor blades 42. In general, a higher pitch angle 78 will result in more lift and higher drag on the rotor blade 42, up to the point where stalling occurs (at which point lift has declined below a value necessary to sustain flight). The pitch angle 78 of the rotor blade 42 may be manipulated by both cyclic and collective pitch controls.

Figure 4:
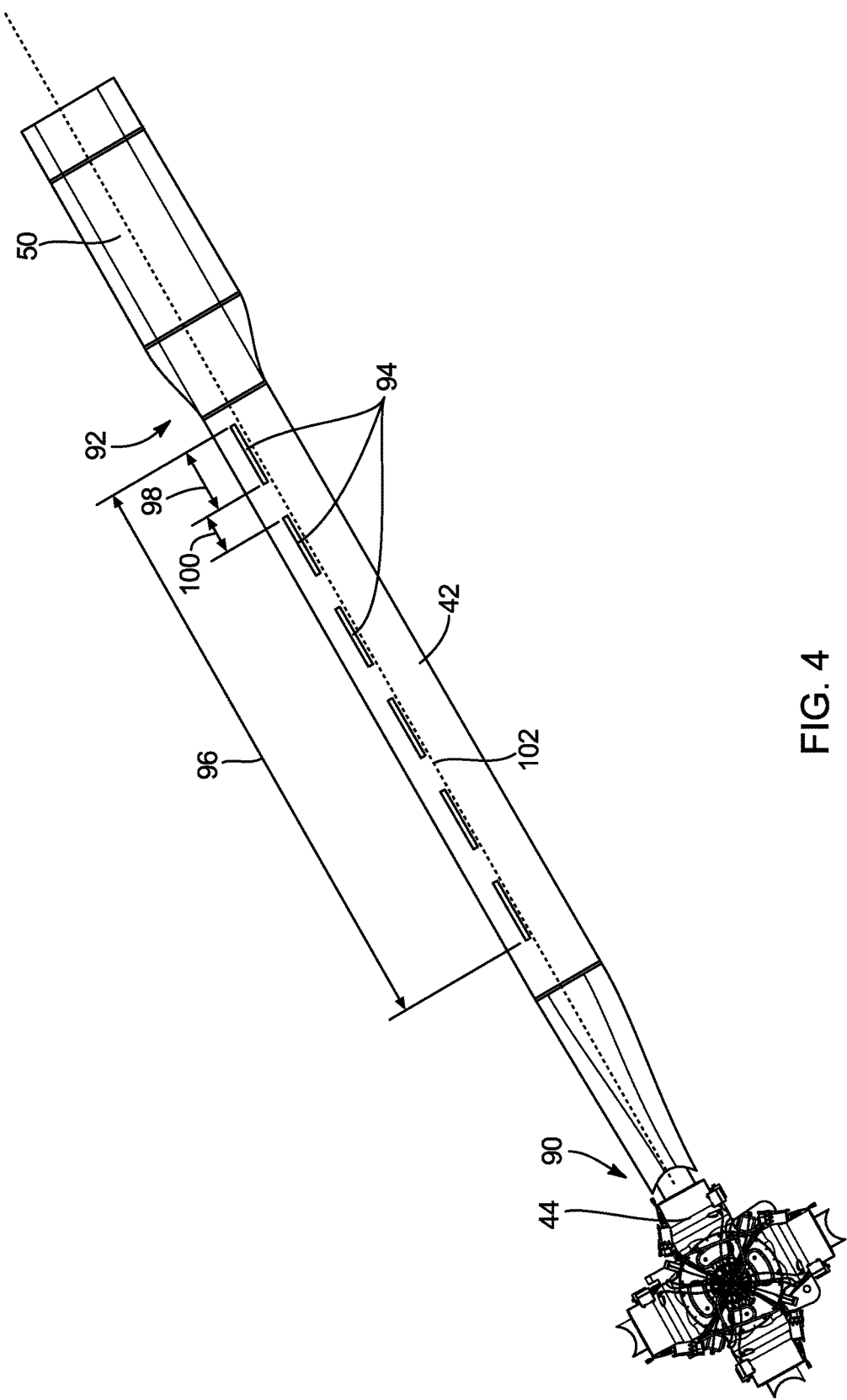
FIG. 4 is a top plan view of a hub and rotor having vents in accordance with an embodiment of an apparatus in accordance with the present invention.

Referring to FIG. 4, the blades 42 coupled to the hub 44 may define a proximal end 90 coupled to the hub 44 and a distal end 92 outboard from the proximal end. The blade 42 may define a plurality of vents 94, valves 94, or other air-emitting structures 94 (hereinafter vents 94) along the length thereof. The vents 94 may extend along a region 96 of the blade 42, which may be less than or equal to the extent of the blade between the proximal end 90 and distal end 92. In some embodiments, the region 96 extends from the tip jet 50 partially or completely to the hub 44.

Inasmuch as lift on the blades 42 occurs mostly (to the greatest extent) on the outboard portion, the vents 94 may need to extend only partially from the tip jet 50 toward the proximal end 90. The vents 94 may define a width 98 and a spacing 100 between vents. The width 98 and spacing 100 may be constant within the region 96 or one or both may vary.

The width 98 and spacing 100 may be chosen to provide adequate circulation control of lift while preserving the structural strength and frequency response of the blade. Although the vents 94 are shown as rectangular in shape with the long dimension generally parallel to a longitudinal axis 102 of the blade 42, they may also be embodied as rows of small circular or rectangular holes 94 distributed along the longitudinal axis 102 within the region 96. The longitudinal axis 102 may be defined as a line extending between the proximal end 90 and the distal end 92.

Figure 5:
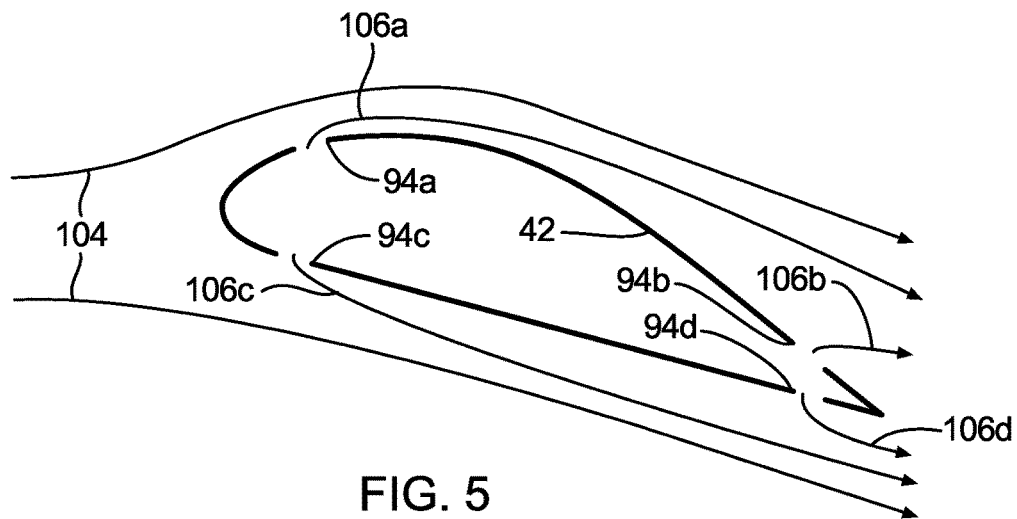
FIG. 5 is a side cross-sectional view of a blade defining a plurality of vents in accordance with an embodiment of an apparatus in accordance with the present invention.

FIG. 5 illustrates a cross-section of a blade 42 proximate a vent 94. The blade 42 may include one or more vents 94a-94d at any one of the positions illustrated, or at some other position on the blade 42. For example, a vent 94a may be positioned on the upper surface of the blade 42 near the leading edge, whereas a vent 94b may be positioned on the upper surface of the blade near the trailing edge. A vent 94c may be positioned on the lower surface of the blade 42 near the leading edge and a vent 94d may be positioned on the lower surface of the blade 42 near the trailing edge.

One suitable configuration may include only a vent 94a on the upper surface near the leading edge and a vent 94d on the lower surface near the trailing edge. In other embodiments, a blade 42 includes vents 94a only or vents 94d only. In still other embodiments, some portions of the blade 42 include vents 94a, 94d while others include only a vent 94a.

The air flow 104 induced over the blade 42, by rotation of the blade 42 and the airspeed of the aircraft 10, combined with air flows 106a-106d from the vents 94a-94d, alters the effective aerodynamic cross section of the blade 42. In some embodiments, each of the vents 94a-94d included in an actual implementation is independently controlled. Such control provides that the air flows 106a-106d may be independently tuned to achieve a desired aerodynamic cross section. That cross section may vary among various locations within the region 96 as well as among specific points (angles) of the rotation of the blade 42.

Figure 6:
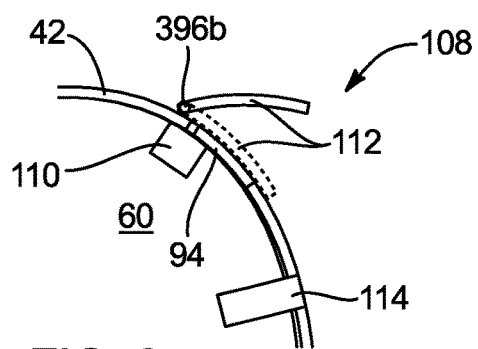
FIG. 6 is a side cross-sectional view of a vent having a valve for controlling air flow therethrough in accordance with an embodiment of an apparatus in accordance with the present invention.

Referring to FIG. 6, airflow through a vent 94, such as any one of the vents 94a-94d of FIG. 5, may be controlled by a valve 108. In some embodiments, one may reduce latency between adjustment of the valve 108 and adjustment of the velocity of an air flow 106a-106d. To do so, the valve 108 may be mounted to the blade 42 adjacent the vent 94.

In the illustrated embodiment, the valve 108 includes an actuator 110 and a flap 112. The flap 112 is coupled to the actuator 110 and selectively positioned over the vent 94. The actuator 110 may be a piezoelectric actuator. The flap 112 and actuator 110 may be mounted to an outer surface of the blade 42 or the actuator 110 may be mounted within the blade 42.

The flap 112 may also function to direct air flow from the vent 94 over the blade in order to achieve a desired degree of circulation control. In some embodiments, an airspeed or pressure sensor 114 mounts to the blade near the vent 94. The sensor 114 may be upstream or downstream from the vent 94. The sensor 114 may provide an output used to characterize lift forces near the vent 94. In some embodiments, the actuator 110 is controlled according to an output of the sensor 114 to increase or decrease lift depending on an operational mode of the aircraft 10.

Air flowing through the vent 94 may flow from the blade duct 60 defined by the blade 42. Alternatively, a separate duct for providing air to the vents 94 may extend through the blade. As for the blade duct 60, this additional duct may be coupled to a compressed air source. Possible sources include an auxiliary compressor powered by the engine 48 or air bled from a compression stage of an engine 48 embodied as a jet engine.

Inasmuch as the air heats as it is compressed, the blade 42 may be formed of a composite material capable of withstanding high temperatures, e.g., greater than about 300° F. The vents 94 may be lined with a material able to withstand higher temperatures than could the bulk material defining the vent 94. Likewise, the blade duct 60 may be coated or lined to enable the blade duct 60 to withstand comparatively higher temperatures than could the remainder of the blade.

Figure 7:
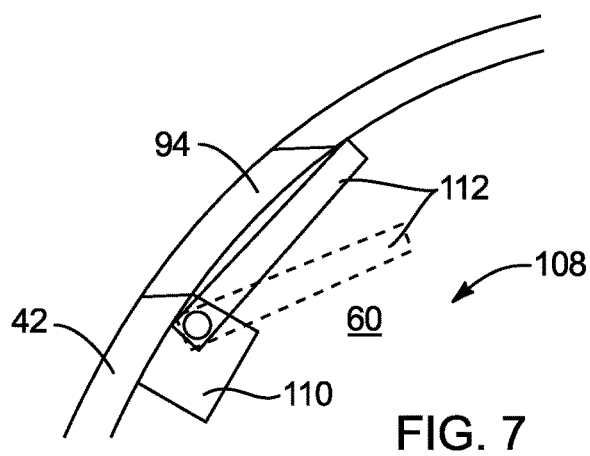
FIG. 7 is a side cross-sectional view of a vent having an internally positioned valve and actuator in accordance with an embodiment of an apparatus in accordance with the present invention.

Referring to FIG. 7, in some embodiments, the valve 108 may be positioned within the blade duct 60 or a separate duct supplying air to the vents 94. In such embodiments, the vent 94 may be shaped, e.g., angled, to direct air over the blade 42 in order to achieve a desired degree of circulation control.

Figure 8:
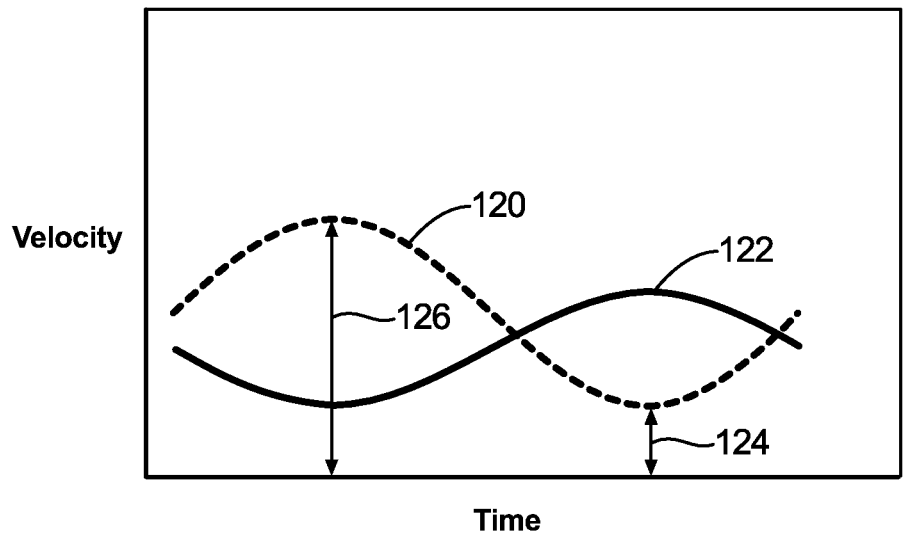
FIG. 8 is a plot of cyclic airflows through a vent formed in a rotor blade in accordance with an embodiment of an apparatus in accordance with the present invention.

Referring to FIG. 8, a coefficient of lift at a given position along the blade may have a cyclic variation shown by the plot 120 or plot 122. The cyclic variation may be produced by cyclic adjustment of the position of the valve 108 and a corresponding change in the effective aerodynamic cross section of the blade 42. The different plots 120, 122 may represent the coefficient of lift at different positions within the region 96 or at different points on the cross section of the blade 42.

For example, one may be for a vent 94a and the other for a vent 94d. The coefficient of lift may vary cyclically with time and may be characterized by a minimum value 124, which may be equal to that of the blade 42 with no air flow, and a maximum coefficient of lift 126.

The plot 120, 122 of the coefficient of lift may be sinusoidal or some other periodic function. The period of the cyclic variation may be equal to the period of rotation of the blade 42, an integer multiple thereof, or the like, e.g., twice the rotational period.

As shown in FIG. 8, the phases of the plots 120, 122 may be different for different points along the region 96 or for different positions on the cross section of the blade 42. The minimum coefficient of lift 124, maximum coefficient of lift 126, and phase of variation may vary, depending on the operational mode of the aircraft 10 as described hereinbelow.

Figure 9:
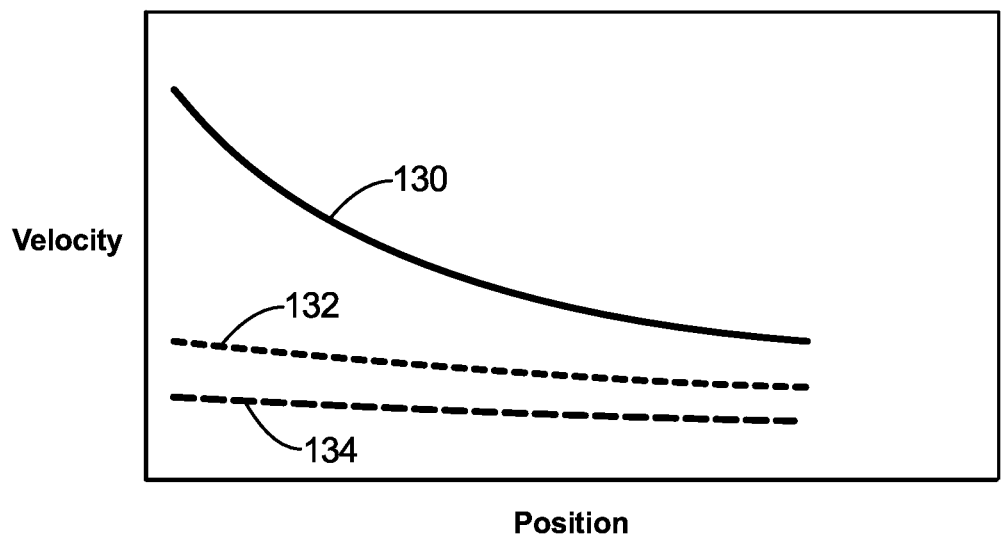
FIG. 9 is a plot of longitudinal airflow profile for vents formed in a rotor blade in accordance with an embodiment of an apparatus in accordance with the present invention.

Referring to FIG. 9, one or more of the minimum coefficient of lift 124, maximum coefficient of lift 126, or a coefficient of lift that does not vary cyclically may vary with respect to longitudinal position. The graph of FIG. 9 illustrates the progression of the coefficient of lift with distance from the hub 44.

For example, plot 130 may correspond to the effective coefficient of lift due to airflow through vents 94a along the length of the blade 42, or another of the vents 94a, 94d. The plot 130 may correspond to a coefficient of lift profile suitable for takeoff, landing, or hovering of the aircraft 10, when the need for a large coefficient of lift is greatest along the length of the blade 42.

Plot 132 may correspond to a coefficient of lift profile suitable for autorotative flight, where a smaller coefficient of lift is needed, but the rotor 40 is primarily responsible for providing lift.

Plot 134 may correspond to a coefficient of lift profile for "unloaded flight" wherein the wings 14, rather than the rotor 40, are primarily responsible for providing lift and therefore a much smaller coefficient of lift is needed.

The illustrated longitudinal and cyclical coefficient of lift profiles of FIGS. 8 and 9 are exemplary only. Many other profiles may be defined across the flight envelope of the aircraft 10. In general the airflow velocity emitted from a given vent 94a-94d at a given position along the blade 42 may be chosen to move from the fixed aerodynamic properties of the actual geometry of the blade 42 to aerodynamic properties closer to the desired figure of merit (FOM) for the blade 42 for a given operating condition. The FOM for a given operating condition may define an optimum angle of attack, chord thickness, chord length, and other properties for the airfoil contour of the blade 42 at a given location.

The air velocity from one or more of the vents 94a-94d may be controlled to adjust the effective airfoil contour of the blade 42 at a given location to be closer to the optimum contour at that location for a given operational mode than is the fixed blade geometry or the effective coefficient of lift profile for another operational mode.

Again, as noted above, the longitudinal variation of the coefficient of lift described in the plots 130-134 may be combined with embodiments wherein the coefficient of lift is also varied cyclically. Accordingly, the plots 130-134 may correspond to longitudinal variation of one or more of the minimum coefficient of lift 124, maximum coefficient of lift 126, a constant coefficient of lift, or of a cyclic coefficient of lift profile in the vicinity of one or more vents 94a-94d.

Figure 10:
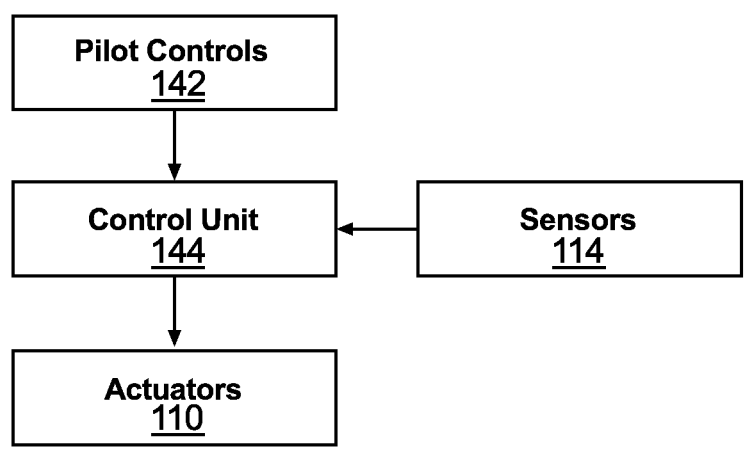
FIG. 10 is a schematic block diagram of a control system for a rotorcraft incorporating vents formed in the blades thereof in accordance with an embodiment of an apparatus in accordance with the present invention.

Referring to FIG. 10, a control system 140 for an aircraft 10 may include pilot controls 142 for receiving inputs regarding one or more of throttle position, cyclic pitch, collective pitch, rudder position, elevator position, aileron position, and the like. The system 140 may further include a control unit 144 for performing automated control of the aircraft 10, such as autopiloting and the like. The control unit 144 may receive inputs from the controls 142 and translate the signals into control signals for actuators.

The control unit 144 may be operably coupled to one or both of the actuators 110 and sensors 114. The control unit 144 may actuate the actuators 110 effective to achieve one or both of a cyclic and longitudinal coefficient of lift profile, such as those illustrated in FIGS. 8 and 9. The control unit 144 may determine how to cyclically or longitudinally dependently vary the opening and closing of valves 108 based on one or more of a pilot instruction regarding an operating mode, outputs of sensors 114, and outputs of other sensors, such as an airspeed sensor for the aircraft 10.

Figure 11:
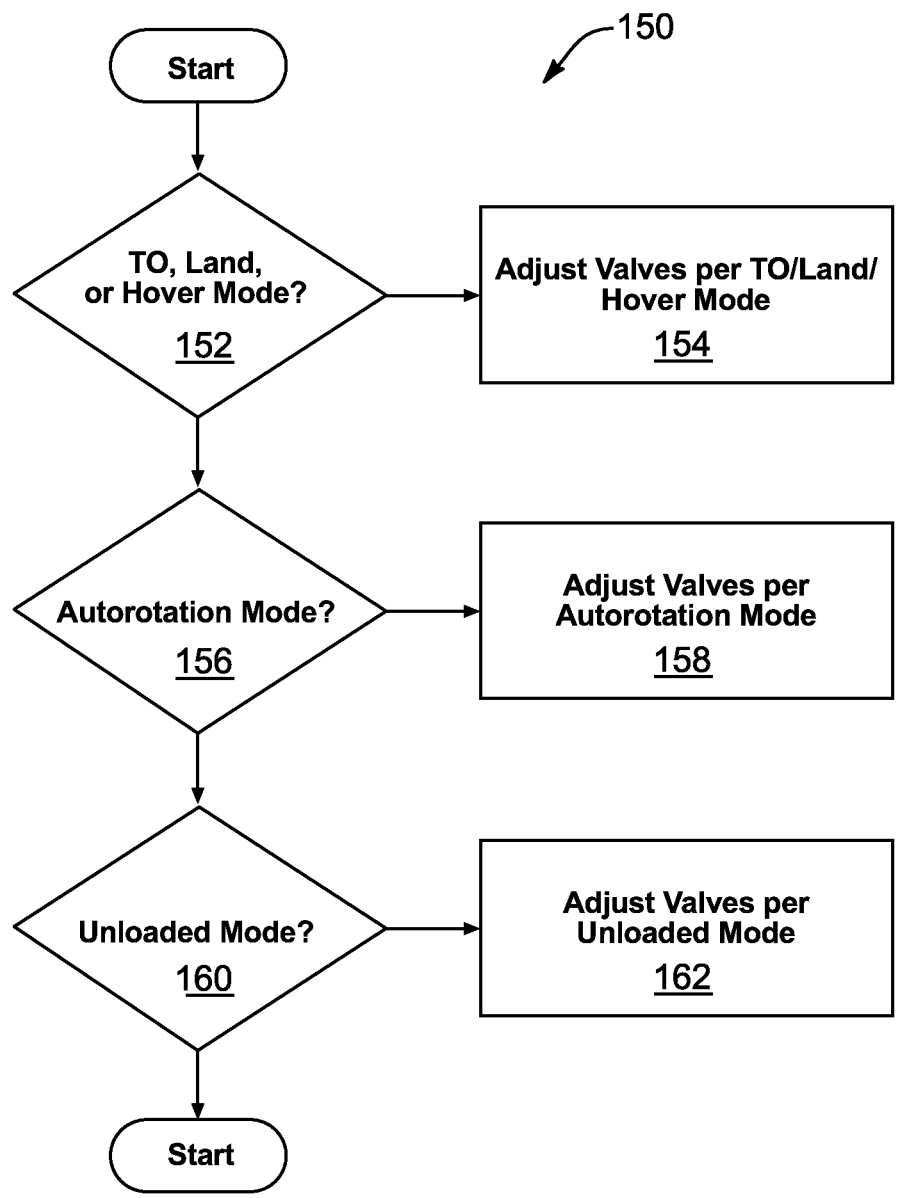
FIG. 11 is a process flow diagram of a method for controlling airflow through vents in the blades of a rotorcraft in accordance with an embodiment of an apparatus in accordance with the present invention.

Referring to FIG. 11, the control unit 144 may perform the illustrated method 150. The method 150 may include evaluating 152 whether the aircraft 10 is taking off, hovering, or landing or whether a pilot instruction to do so has been received. If so, then the valves 108 are adjusted 154 along the blade 42 in one or both of a longitudinally varying and cyclically varying manner. Thus one may change the effective FOM of the blade 42 to be closer to the optimal FOM. That FOM may be for vertical flight, flight with a high rate of climb or descent, or otherwise. It is greater than is the FOM for the original geometry of the blade 42. This may be so for the cyclic, longitudinal, or both lift profiles corresponding to other operational modes.

The method 150 may further evaluate 156 whether the aircraft 10 is engaged in, or has been instructed by a pilot to engage in, autorotative flight with the rotor 40 unpowered and providing lift to the aircraft 10 due to autorotation. If so, then the valves 108 are adjusted 158 along the blade 42 in one or both of a longitudinally varying and cyclically varying manner to change the effective FOM of the blade 42 to be closer to the optimal FOM for autorotative flight than that of the original geometry of the blade 42, or the cyclic, longitudinal, or both lift profiles corresponding to other operational modes.

The method 150 may further evaluate 160 whether the aircraft 10 is engaged in unloaded flight such that lift is primarily provided by the wings 14 rather than the rotor 40. If so, then the valves 108 are adjusted 162 along the blade 42 in one or both of a longitudinally varying and cyclically varying manner in order to change the effective FOM of the blade 42 to be closer to the FOM for unloaded flight than is the original geometry of the blade 42 or the cyclic, longitudinal, or both lift profiles corresponding to other operational modes.

The method 150 may be performed in a continuous manner such that as the flight of the aircraft 10 transitions between vertical, autorotative, and unloaded flight, the opening of the valves 108 is gradually adjusting accordingly to suit the current flight conditions.

The calculation of the control signals to be coupled to the valves 108 may be performed by the control unit 144. Alternatively, a pilot or the control unit 144 may specify an operating mode and distributed control systems located at the hub 44 or adjacent each actuator 110 and sensors 114 may perform feedback controlled adjustment of the flaps 112 according to sensor outputs and the specified operating mode according to the method 150.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. A rotorcraft comprising:
an airframe;
a rotor mounted to the airframe, the rotor including a plurality of blades each defining a blade duct and a plurality of vents along a longitudinal extent thereof;
a plurality of valves positioned to control airflow from the blade duct through the plurality of vents;
a compressed air source in fluid communication with the blade ducts; and
a control unit operably coupled to the plurality of valves and programmed to adjust the valves to control a velocity of air exiting the valves effective to achieve a first longitudinally varying flow velocity magnitude profile of airflows exiting the valves of the plurality of valves along each blade in a first operational mode and adjust the valves effective to achieve a second longitudinally varying flow velocity magnitude profile of air flows exiting the valves of the plurality of valves along each blade in a second operational mode, the control module further programmed to adjust the valves to achieve one of the first and second longitudinally varying flow velocity magnitude profiles responsive to a pilot input;

wherein the first operational mode includes at least one of taking off, hovering, and landing;

wherein the second operational mode is autorotative flight;

wherein the first longitudinally varying flow velocity magnitude profile is closer to a first figure of merit than a geometry of the blade, the first figure of merit being suitable for the first operational mode; and wherein the second longitudinally varying flow velocity magnitude profile is closer to a second figure of merit than the geometry of the blade and the first longitudinally varying flow velocity magnitude profile, the second figure of merit being suitable for the second operational mode.

2. The rotorcraft of claim 1, wherein the control system is further programmed to adjust the valves effective to achieve a third longitudinally varying flow velocity magnitude profile along each blade in a third operational mode;

wherein the third operational mode is unloaded flight.

3. The rotorcraft of claim 1, wherein the valves are coupled to piezoelectric actuators, the piezoelectric actuators being operably coupled to the control unit.

4. The rotorcraft of claim 1, wherein the control system is programmed to cyclically vary the first and second longitudinally varying flow velocity magnitude profiles with a period equal to an integer multiple of a period of rotation of the rotor.

5. The rotorcraft of claim 1, wherein the valves are mounted to the blades proximate a leading edge thereof.

6. The rotorcraft of claim 1, wherein the valves are mounted to the blades proximate a trailing edge thereof.

7. The rotorcraft of claim 1, wherein valves are mounted to the blades proximate both the leading and trailing edges thereof.

8. A method for operating a rotorcraft comprising:
flying the rotorcraft in a first operational mode, the rotorcraft including an airframe and a rotor mounted to the airframe, the rotor including a plurality of blades each defining a blade duct, a plurality of vents distributed along a longitudinal extent thereof in selective fluid communication with the blade duct, a plurality of valves coupled to the blade, each valve of the plurality of valves controlling a velocity magnitude of airflow from the blade duct through a vent of the plurality of vents, the rotorcraft further comprising a compressed air source in fluid communication with the blade ducts of the plurality of blades;

while flying the rotorcraft in the first operational mode adjusting the plurality of valves effective to achieve a first longitudinally varying flow velocity magnitude profile of the airflows exiting the vents of the plurality of vents along each blade of the plurality of blades;

transitioning the rotorcraft to a second operational mode; and while flying the rotorcraft in the second operational mode adjusting the plurality of valves responsive to a pilot input effective to achieve a second longitudinally varying flow velocity magnitude profile of the airflows exiting the vents of the plurality of vents along each blade of the plurality of blades, the second longitudinally varying flow velocity magnitude profile being different from the first lift profile;

wherein flying the rotorcraft in the first operational mode includes at least one of taking off, hovering, and landing;

wherein flying the rotorcraft in the second operational mode comprises flying the rotorcraft in autorotative flight;

wherein the first longitudinally varying flow velocity profile is closer to a first figure of merit than a geometry of the blade, the first figure of merit suitable for the first operational mode; and wherein the second longitudinally varying flow velocity profile is closer to a second figure of merit than the geometry of the blade and the first lift profile, the second figure of merit suitable for the second operational mode.

9. The method of claim 8, further comprising:
flying the rotorcraft in a third operational mode; and
while flying the rotorcraft in a third operational mode, adjusting the valves effective to achieve a third longitudinally varying flow velocity profile along each blade;

wherein the third operational mode is unloaded flight.

10. The method of claim 8, wherein the valves comprise piezoelectric actuators.

11. The method of claim 8, further comprising, while flying the rotorcraft in the second operational mode, cyclically adjusting the valves.

12. The method of claim 8, wherein the valves are mounted to the blades proximate a leading edge thereof.

13. The method of claim 8, wherein the valves are mounted to the blades proximate a trailing edge thereof.

14. The method of claim 8, wherein the valves are mounted to the blades proximate both the leading and trailing edges thereof.

* * * * *